US012749961B2

(12) United States Patent
Gong et al.

(10) Patent No.: US 12,749,961 B2
(45) Date of Patent: Sep. 29, 2026

(54) VOICE COIL MOTOR, ZOOM LENS AND PHOTOGRAPHY DEVICE

(71) Applicant: ZHONGSHAN UNION OPTECH RESEARCH INSTITUTE CO., LTD., Zhongshan (CN)

(72) Inventors: Junqiang Gong, Zhongshan (CN); Meijiao Zhao, Zhongshan (CN); Shengping Qiu, Zhongshan (CN); Kun Li, Zhongshan (CN); Minde Li, Zhongshan (CN); Hao Wang, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 280 days.

(21) Appl. No.: 18/411,933

(22) Filed: Jan. 12, 2024

(65) Prior Publication Data

US 2024/0162798 A1 May 16, 2024

Related U.S. Application Data

(63) Continuation of application No. PCT/CN2023/131825, filed on Nov. 15, 2023.

(30) Foreign Application Priority Data

Nov. 15, 2022 (CN) ......................... 202211438019.5

(51) Int. Cl.
*G03B 5/00* (2021.01)
*H02K 41/035* (2006.01)

(52) U.S. Cl.
CPC ........... *H02K 41/0356* (2013.01); *G03B 5/00* (2013.01); *G03B 2205/0046* (2013.01); *G03B 2205/0069* (2013.01)

(58) Field of Classification Search
None
See application file for complete search history.

(56) References Cited

U.S. PATENT DOCUMENTS 6,026,064 A * 2/2000 Izumi .................. G11B 7/0925 369/44.14
8,830,604 B2 * 9/2014 Sato ...................... G02B 7/102 359/824

FOREIGN PATENT DOCUMENTS

CN 101527494 A 9/2009
CN 203482068 U 3/2014
(Continued)

OTHER PUBLICATIONS

International Search Report and Written Opinion issued in corresponding PCT Application No. PCT/CN2023/131825, dated Jan. 22, 2024.

(Continued)

*Primary Examiner* — Robert E. Tallman
(74) *Attorney, Agent, or Firm* — Westbridge IP LLC

(57) ABSTRACT

Disclosed are a voice coil motor, a zoom lens and a photography device. The voice coil motor includes a machine shell, an annular magnetic yoke, a plurality of magnets and a mover structure. The annular magnetic yoke is provided on the machine shell. The plurality of magnets are provided in the annular magnetic yoke and are provided at interval along a length direction of the annular magnetic yoke. The mover structure includes a mover coil movably sleeved on a yoke section of the annular magnetic yoke.

9 Claims, 6 Drawing Sheets

(56) References Cited

FOREIGN PATENT DOCUMENTS

| | | | |
|---|---|---|---|
| CN | 105827096 | A | 8/2016 |
| CN | 208739000 | U | 4/2019 |
| CN | 209516895 | U | 10/2019 |
| CN | 113093359 | A | 7/2021 |
| CN | 113131709 | A | 7/2021 |
| CN | 113156606 | A | 7/2021 |
| CN | 115694120 | A | 2/2023 |
| CN | 219107274 | U | 5/2023 |
| JP | 2016122044 | A | 7/2016 |

OTHER PUBLICATIONS

First Office Action issued in counterpart Chinese Patent Application No. 202211438019.5, dated Jan. 5, 2026.

* cited by examiner

VOICE COIL MOTOR, ZOOM LENS AND PHOTOGRAPHY DEVICE

CROSS-REFERENCE TO RELATED APPLICATIONS

This application is a continuation application of International Application No. PCT/CN2023/131825, filed on Nov. 15, 2023, which claims priority to Chinese Patent Application No. 202211438019.5, filed on Nov. 15, 2022. The disclosures of the above-mentioned applications are incorporated herein by reference in their entireties.

TECHNICAL FIELD

The present application relates to the technical field of photography devices, and in particular, to a voice coil motor, a zoom lens and a photography device.

BACKGROUND

Voice coil motors include magnets. In current voice coil motors, in order to have a larger stroke, the magnets are set longer. However, longer magnets can easily lead to high processing costs and breakage during processing.

SUMMARY

The main purpose of the present application is to provides a voice coil motor, a zoom lens and a photography device, which aim to solve the existing problem that longer magnets in the voice coil motor can easily lead to high processing costs and breakage during processing.

In order to achieve the above purpose, the present application provides a voice coil motor. The voice coil motor includes a machine shell, an annular magnetic yoke, a plurality of magnets and a mover structure. The annular magnetic yoke is provided on the machine shell. The plurality of magnets are provided in the annular magnetic yoke and are provided at interval along a length direction of the annular magnetic yoke. The mover structure includes a mover coil movably sleeved on a yoke section of the annular magnetic yoke.

In some embodiments, the magnets are rectangular, and a length direction of the magnets is consistent with the length direction of the annular magnetic yoke.

In some embodiments, each of the magnets has a same length and/or a same width.

In some embodiments, two adjacent magnets are flush at both side end surfaces in a width direction.

In some embodiments, the annular magnetic yoke includes two straight yoke sections opposite to each other; and the plurality of magnets are provided on a same straight yoke section.

In some embodiments, the annular magnetic yoke includes two straight yoke sections opposite to each other; and two adjacent magnets are provided on different straight yoke sections.

In some embodiments, each of the magnets is adhered to the annular magnetic yoke.

In some embodiments, a plurality of mover coils are provided; and the mover structure further includes a mobile carrier connected to the plurality of mover coils.

The present application further provides a zoom lens including the above-mentioned voice coil motor.

The present application further provides a photography device including the above-mentioned zoom lens.

In the technical solution of the present application, a plurality of magnets are provided at intervals along the length direction of the annular magnetic yoke to realize multi-section magnets to replace the traditional long magnets, thus reducing the processing cost and also reducing the risk of breakage during processing and molding.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
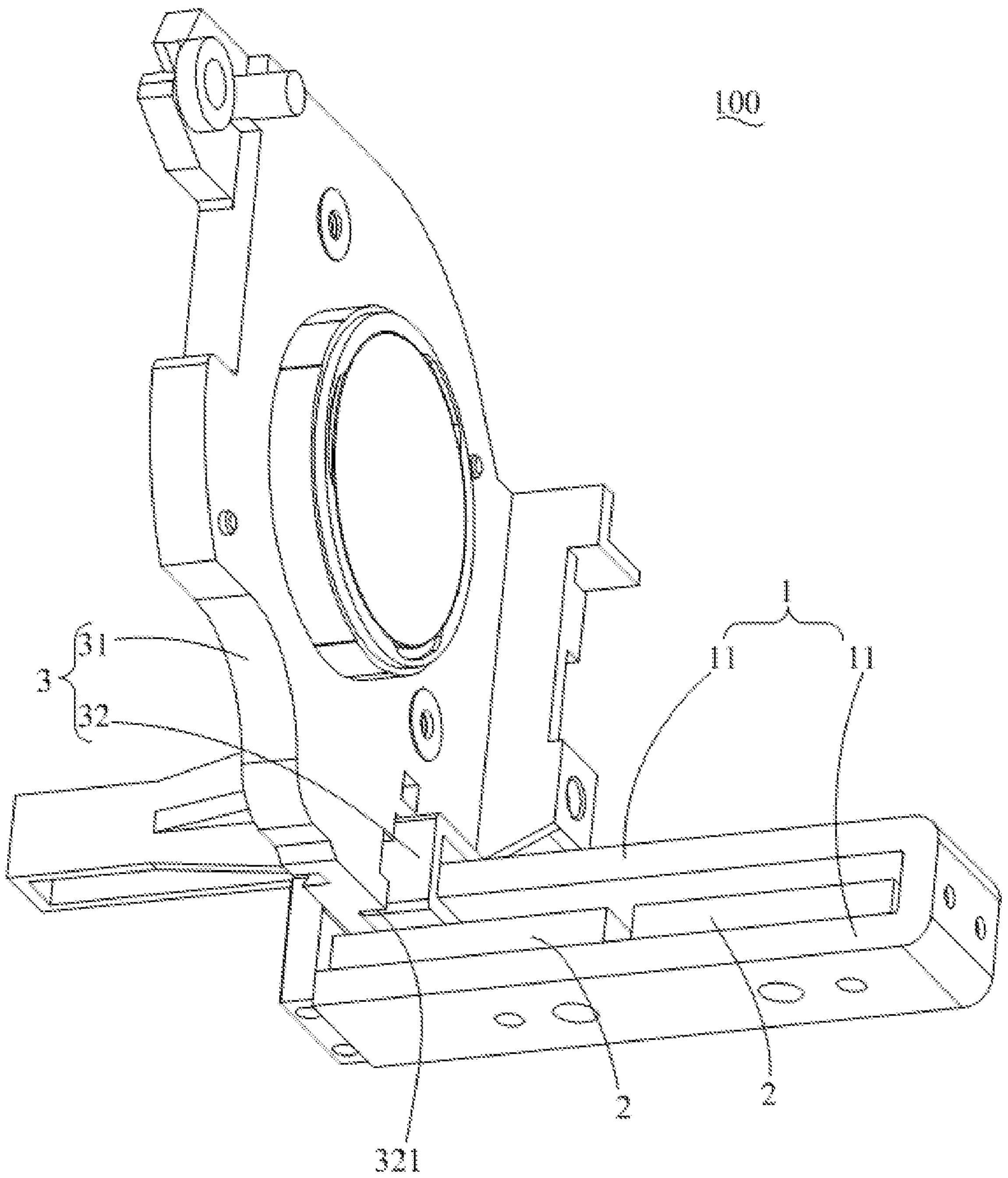
FIG. 1 is a schematic structural view of a voice coil motor according to some embodiments of the present application.
Figure 2:
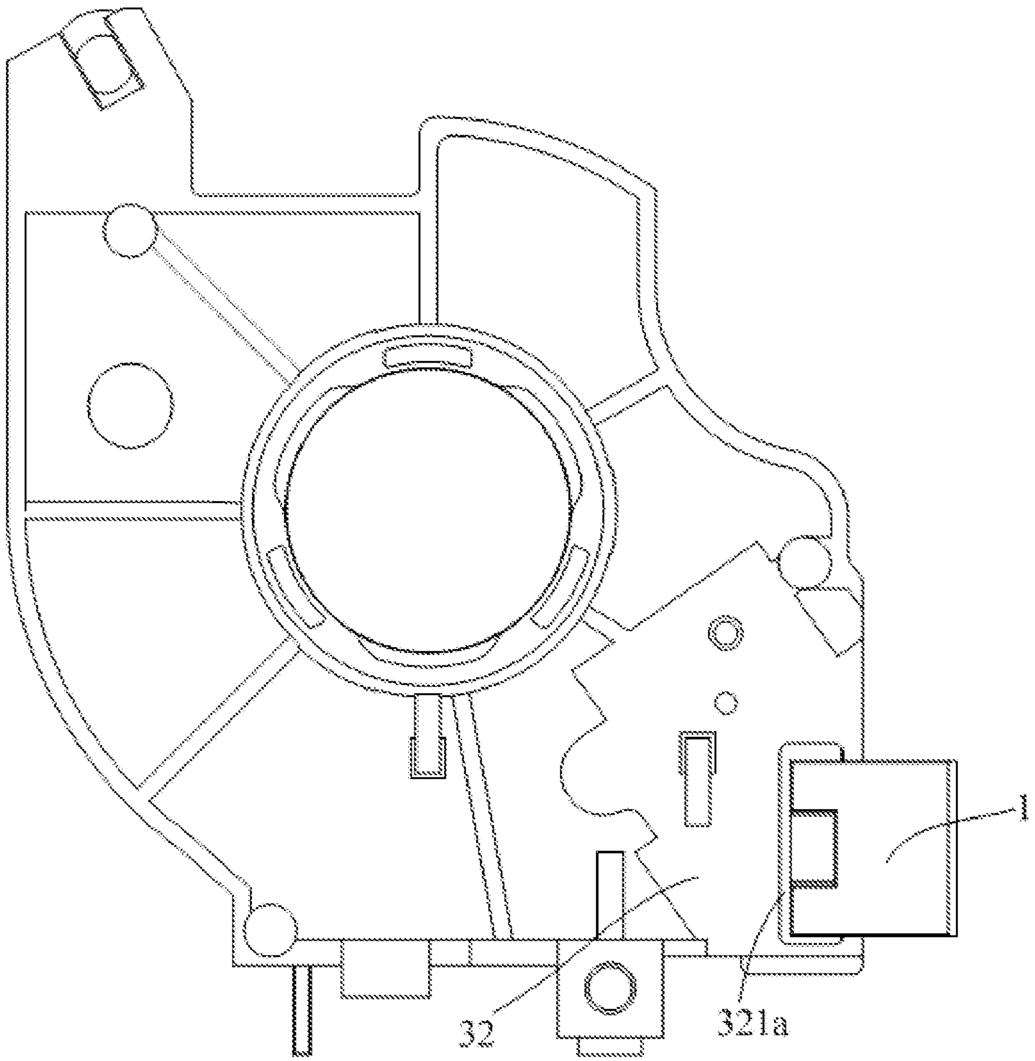
FIG. 2 is a top view of the voice coil motor in FIG. 1.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that if there are directional indications (such as up, down, left, right, front, rear, etc.) in the present application, the directional indications are only used to explain the relative positional relationship, movement situation, etc. among components in a specific attitude (as shown in the drawings). If the specific attitude changes, the directional indication also changes accordingly.

In addition, the descriptions related to “first”, “second” and the like in the present application are merely for descriptive purposes, and should not be understood as indicating or implying their relative importance or implicitly indicating the number of technical features indicated. Therefore, the features defined by “first” and “second” may explicitly or implicitly include at least one such feature. In addition, “and/or” in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

Voice coil motors include magnets. In current voice coil motors, in order to have a larger stroke, the magnets are set longer. However, longer magnets can easily lead to high processing costs and breakage during processing.

In view of this, the present application provides a voice coil motor. FIG. 1 to FIG. 6 illustrate the voice coil motor according to an embodiment of the present application.

As shown in FIG. 1 to FIG. 6, the voice coil motor 100 includes a machine shell (not shown in the drawings), an annular magnetic yoke 1, a plurality of magnets 2 (two or more) and a mover structure 3. The annular magnetic yoke 1 is provided on the machine shell. The plurality of magnets 2 are provided in the annular magnetic yoke 1 and are provided at interval along a length direction of the annular magnetic yoke 1. The mover structure 3 includes a mover coil 31 and the mover coil 31 is movably sleeved on a yoke section of the annular magnetic yoke 1.

In the technical solution of the present application, a plurality of magnets 2 are provided at intervals along the length direction of the annular magnetic yoke 1 to form a plurality of sections of magnets 2 to replace the traditional long magnets, thereby reducing the processing cost and also reducing the risk of easy breakage during processing and molding.

In some embodiments, each of the magnets 2 is provided in a rectangular shape, and a length direction of each of the magnets is consistent with the length direction of the annular magnetic yoke 1. The interval occupied by the plurality of magnets 2 is defined as a magnetic interval. In this technical solution, the length direction of each magnet 2 is consistent with the length direction of the annular magnetic yoke 1, so that a longer magnetic interval length can be achieved by just fewer magnets 2. In this way, the voice coil motor 100 has a larger driving stroke.

In some embodiments, each magnet 2 has a same length and/or a same width. This arrangement ensures that the magnets 2 have the same size, making it easier to process and manufacture, and reducing processing costs.

In some embodiments, two adjacent magnets 2 are flush at both side end surfaces in a width direction. With this arrangement, the plurality of magnets 2 are provided more reasonably, which is beneficial to the movement of the driving coil.

The yoke section of the annular magnetic yoke 1 may be the straight yoke section 11 of the annular magnetic yoke 1. In some embodiments, the annular magnetic yoke 1 includes two straight yoke sections 11 opposite to each other, and the plurality of magnets 2 are provided on a same straight yoke section 11. A plurality of the magnets 2 are provided on a longer section of the annular magnetic yoke 1. In this way, it is more convenient for the coil to move under the magnetic field of the plurality of magnets 2, so that the voice coil motor 100 has greater drive stroke.

The yoke section of the annular magnetic yoke 1 may be the straight yoke section 11 of the annular magnetic yoke 1. In some embodiments, the annular magnetic yoke 1 includes two straight yoke sections 11 opposite to each other, and two adjacent magnets 2 are provided on different straight yoke sections 11. That is to say, a plurality of the magnets 2 are provided on a longer section of the annular magnetic yoke 1. In this way, it is more convenient for the coil to move under the magnetic field of the plurality of magnets 2, so that the voice coil motor 100 has greater driving stroke.

In some embodiments, each magnet 2 is adhered to the annular magnetic yoke 1. The magnet 2 is installed on the annular magnetic yoke 1 by bonding. The installation is firm and the structure is simple.

In some embodiments, a plurality of mover coils 31 are provided. The mover structure 3 includes a mobile carrier 32 connected to the plurality of the mover coils 31. The mobile carrier 32 may be a moving frame on a zoom lens, the moving frame is provided with a lens, and the moving frame can move up and down to achieve zooming. In this technical solution, by connecting the mobile carrier 32 to the plurality of mover coils 31, the plurality of mover coils 31 are energized and move up and down under the magnetic field of the plurality of magnets 2, thereby driving the moving frame to move up and down to achieve zooming of the zoom lens. Moreover, the mover coil 31 in this technical solution uses a plurality of mover coils 31. By changing one coil into a plurality of coils, the power supply pressure of the chip is reduced.

In some embodiments, one mover coil 31 can also be provided. Specifically, the mover structure 3 also includes a mobile carrier 32, and the mobile carrier 32 is provided with a fixing slot 321 (see FIG. 2 for details). The mover coil 31 is embedded in the fixing slot 321, and is provided in such a way that the mover coil 31 is firmly connected to the mobile carrier 32 to prevent the mover coil 31 from loosening on the mobile carrier 32 during the movement.

Figure 3:
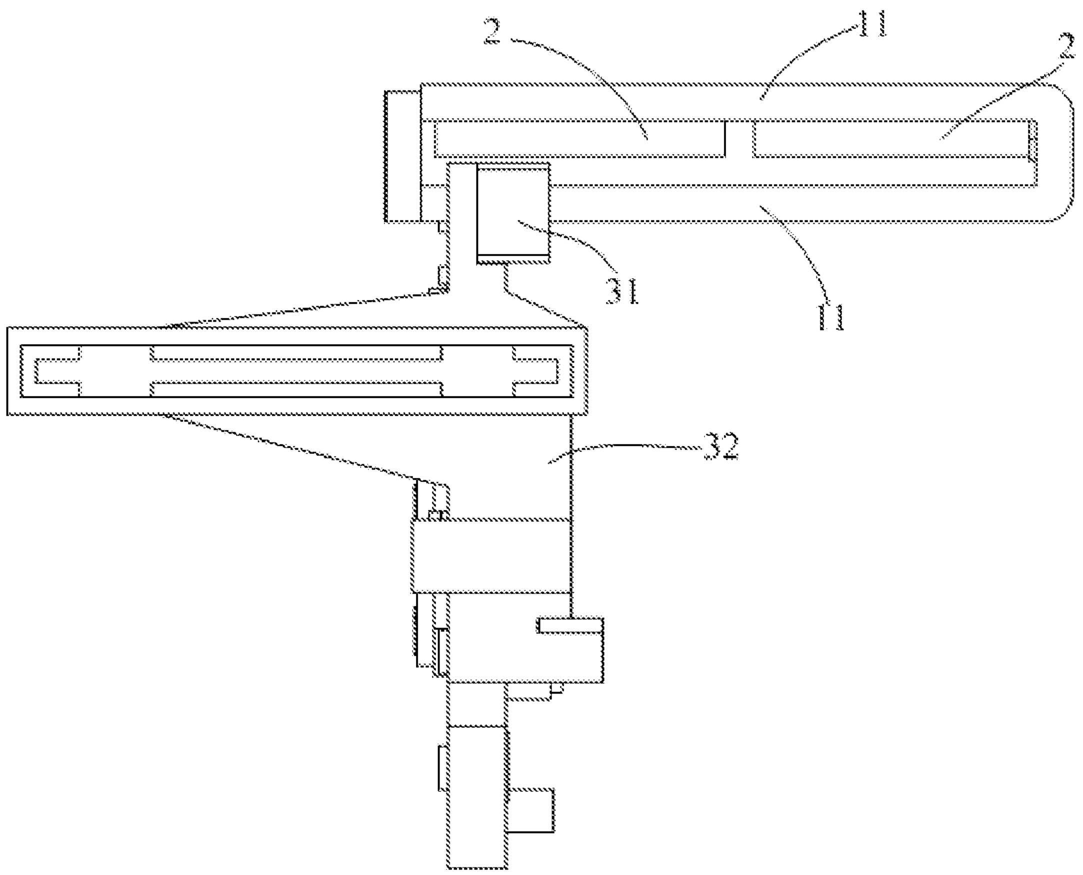
FIG. 3 is a side view of the voice coil motor in FIG. 1.
Figure 4:
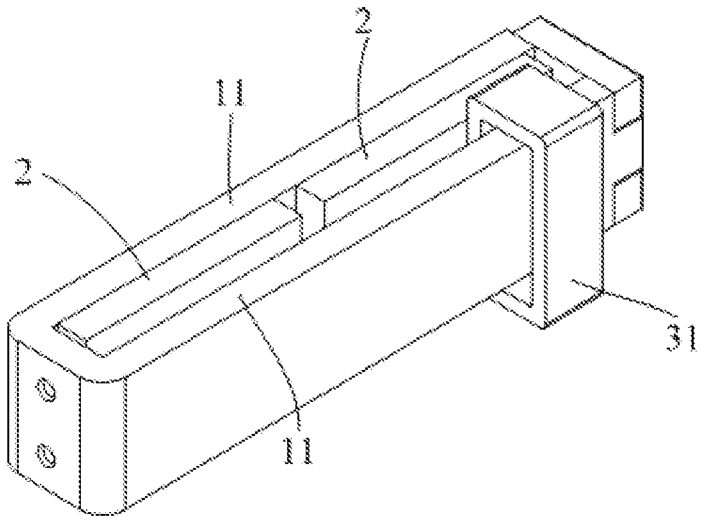
FIG. 4 is a schematic structural view of the voice coil motor (without a mobile carrier) in FIG. 1.
Figure 5:
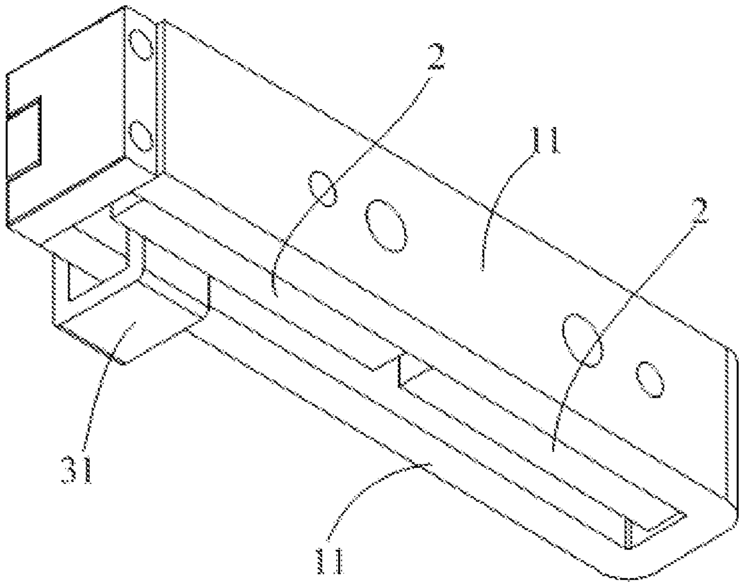
FIG. 5 is a schematic structural view from another viewpoint of the voice coil motor (without the mobile carrier) in FIG. 4.
Figure 6:
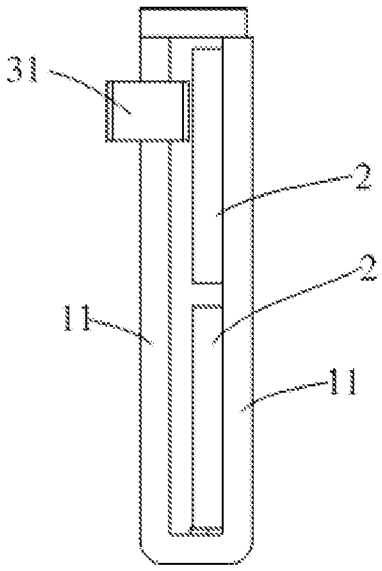
FIG. 6 is a side view of the voice coil motor (without the mobile carrier) in FIG. 4.

Further, the bottom of the fixing slot 321 is provided with a through hole 321*a* (see FIG. 3 for details). The through hole 321*a* penetrates the mobile carrier 32, and the annular magnetic yoke 1 is movable through the through hole 321*a*, in this way, the annular magnetic yoke 1 is avoided, so that the mobile carrier 32 can move up and down smoothly under the driving of the mover coil 31.

The machine shell is formed with a cavity, and the annular magnetic yoke 1 is fixed on the inner wall of the cavity. The annular magnetic yoke 1 includes two straight yoke sections 11 opposite to each other. The length direction of the straight yoke section 11 is provided along the depth direction of the cavity, and the mover coil 31 can be movably sleeved on the straight yoke section 11. When the mover coil 31 is energized, a permanent magnetic field is generated, which converts electrical energy into mechanical energy by changing the DC current of the coil in the motor, driving the mobile carrier 32 connected to the mover coil 31 to move, so that the mobile carrier 32 moves along the depth direction of the cavity. Since the mobile carrier 32 is provided with a lens, the mobile carrier 32 moves along the depth direction of the cavity to drive the movement of the lens, thereby achieving zooming with fast zooming speed, high focusing accuracy, low power consumption, and low noise. At the same time, since the annular magnetic yoke 1 is fixed on the inner wall of the cavity, after the voice coil motor 100 is fully assembled, the annular magnetic yoke 1, the plurality of magnets 2 and the mover structure 3 are accommodated inside, which improves the compactness of the voice coil motor 100.

In order to make the mobile carrier 32 move smoothly, a guide structure is provided between the mobile carrier 32 and the machine shell. The guide structure includes a guide rod extending along the depth direction of the cavity and a guide hole adapted to the guide rod. The guide rod is provided in the cavity, and the guide hole is provided on the mobile carrier 32. In this way, the guide rod matches the guide hole, such that the mobile carrier 32 can move smoothly along the depth direction of the cavity.

The annular magnetic yoke 1 is detachably connected to the inner wall of the cavity. This arrangement facilitates replacement of the voice coil motor 100. There are many ways to realize the detachable connection between the annular magnetic yoke 1 and the inner wall surface of the cavity. For example, the annular magnetic yoke 1 and the inner wall surface of the cavity are fixed by screws. Specifically, in some embodiments of the present application, the inner wall of the cavity is provided with a first threaded hole, a threaded connector is inserted into the first threaded hole, the annular magnetic yoke 1 is provided with a second threaded hole corresponding to the first threaded hole, and the second threaded hole is threadedly connected to the threaded end of the threaded connector. This arrangement enables detachable connection between the annular magnetic yoke 1 and the inner wall of the cavity.

In order to accurately install the annular magnetic yoke 1, a positioning structure is also provided between the annular magnetic yoke 1 and the machine shell. The positioning structure includes a positioning part and a matching part that matches the positioning part. One of the positioning part and the matching part is provided on the annular magnetic yoke 1 and the other is provided on the machine shell. With this arrangement, with the positioning part and the mating part matching to each other, the annular magnetic yoke 1 can be accurately installed in the cavity of the machine shell. Specifically, in some embodiments of the present application, the positioning part is provided on the machine shell, the positioning part is provided as a positioning rod, the matching part is provided on the annular magnetic yoke 1, and the matching part is provided as a positioning hole. By inserting the positioning rod into the positioning hole, the precise installation of the annular magnetic yoke 1 is achieved.

The present application also provides a zoom lens, including the voice coil motor 100 as described above. Since this zoom lens adopts all the technical solutions of the embodiments of the voice coil motor 100 mentioned above, it has at least all the beneficial effects brought by the technical solutions of the above embodiments, which will not be described again here.

The present application also provides a photography device, including the zoom lens as described above. Since this photographic device adopts all the technical solutions of the embodiments of the zoom lens mentioned above, it has at least all the beneficial effects brought by the technical solutions of the above embodiments, which will not be described again here.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A voice coil motor, comprising:

a machine shell;

an annular magnetic yoke provided on the machine shell;

a plurality of magnets provided in the annular magnetic yoke, the plurality of magnets being provided at interval along a length direction of the annular magnetic yoke; and a mover structure comprising a mover coil, the mover coil being movably sleeved on a yoke section of the annular magnetic yoke, wherein a plurality of mover coils are provided; and the mover structure further comprises a mobile carrier connected to the plurality of mover coils.

2. The voice coil motor of claim 1, wherein the magnets are rectangular, and a length direction of the magnets is consistent with the length direction of the annular magnetic yoke.

3. The voice coil motor of claim 2, wherein each of the magnets has a same length and/or a same width.

4. The voice coil motor of claim 2, wherein two adjacent magnets are flush at both side end surfaces in a width direction.

5. The voice coil motor of claim 1, wherein the annular magnetic yoke comprises two straight yoke sections opposite to each other; and the plurality of magnets are provided on a same straight yoke section.

6. The voice coil motor of claim 1, wherein the annular magnetic yoke comprises two straight yoke sections opposite to each other; and two adjacent magnets are provided on different straight yoke sections.

7. The voice coil motor of claim 1, wherein each of the magnets is adhered to the annular magnetic yoke.

8. A zoom lens, comprising the voice coil motor of claim 1.

9. A photography device, comprising the zoom lens of claim 8.

* * * * *